United States Patent [19]

Yasue et al.

[11] Patent Number: 4,789,937

[45] Date of Patent: Dec. 6, 1988

[54] METHOD AND SYSTEM FOR SHIFT CONTROL OF AN AUTOMATIC TRANSMISSION

[75] Inventors: Hideki Yasue; Kagenori Fukumura, both of Toyota, Japan

[73] Assignee: Toyota Jidosha Kabushiki Kaisha, Toyota, Japan

[21] Appl. No.: 860,297

[22] Filed: May 6, 1986

[30] Foreign Application Priority Data

May 7, 1985 [JP] Japan .................................. 60-96268

[51] Int. Cl.4 ........................ B60K 41/08; B60K 41/06
[52] U.S. Cl. .................................... 364/424.1; 74/866
[58] Field of Search ............... 364/424.1; 74/866, 867, 74/868, 869

[56] References Cited

U.S. PATENT DOCUMENTS

| 4,308,764 | 1/1982 | Kawanioto et al. | 74/866 |
| 4,338,666 | 7/1982 | Suzuki et al. | 364/421.1 |
| 4,346,627 | 8/1982 | Kawanioto et al. | 74/866 |
| 4,350,057 | 9/1982 | Kishi et al. | 74/866 |
| 4,380,048 | 4/1983 | Kishi et al. | 74/866 |
| 4,584,906 | 4/1986 | Nagaoka et al. | 74/866 |
| 4,674,364 | 6/1987 | Shindo et al. | 74/867 |
| 4,693,143 | 9/1987 | Harada et al. | 74/866 |

Primary Examiner—Parshotam S. Lall
Assistant Examiner—V. N. Trans
Attorney, Agent, or Firm—Oblon, Fisher, Spivak, McClelland, & Maier

[57] ABSTRACT

A shift control of an automatic transmission including a first transmission section and a second transmission section, which are capable of shifting automatically and independently of each other, and the first transmission section and the second transmission section are simultaneously or alternately shifted, to achieve multi-gear shifts, in which when shifting is to be achieved by shifting the first transmission section and the second transmission section in directions opposite to each other, and shifting is a down shift in the automatic transmission as a whole, such shifting is prohibited. The advantages of the multi-gear shifts are thus fully utilized to avoid high shift shocks.

7 Claims, 4 Drawing Sheets

FIG. 4
PRIOR ART

| GEARS OF AUTOMATIC TRANSMISSION AS A WHOLE | GEARS OF FIRST TRANSMISSION SECTION | GEARS OF SECOND TRANSMISSION SECTION |
|---|---|---|
| 1ST | 1ST | NON-OVERDRIVE |
| 2ND | ↑ | OVERDRIVE |
| 3RD | 2ND | NON-OVERDRIVE |
| 4TH | ↑ | OVERDRIVE |
| 5TH | 3RD | NON-OVERDRIVE |
| 6TH | ↑ | OVERDRIVE |

METHOD AND SYSTEM FOR SHIFT CONTROL OF AN AUTOMATIC TRANSMISSION

BACKGROUND OF THE INVENTION

1. Field of the Invention

This invention relates to a method and a system for shift control of an automatic transmission for a vehicle, and more particularly to improvements in a method and a system for shift control of an automatic transmission for a vehicle, wherein there are provided at least a first transmission section and a second transmission section, which are capable of shifting automatically and independently of each other, and wherein the first transmission section and the second transmission section are simultaneously and alternately shifted, to thereby achieve multi-gear shifts.

2. Discussion of Background

As the FF (Front engine—Front drive) has been used more widely in the driving system of vehicles in recent years, there has been an increased tendency toward high rpm and high output in an engines. An automatic transmission in a vehicle of the FF type presents a disadvantage in that it is extremely difficult to increase the number of plates in a multi-plate clutch and in a multi-plate brake of the transmission, both being frictionally engaging devices, due to the restriction placed upon the total length of the automatic transmission. In view of the above described disadvantage, to improve the durability of the frictionally engaging devices in the automatic transmission, there has been proposed an automatic transmission, wherein the number of gear stages may be increased by use of the existing automatic transmission added thereto with a so-called overdrive mechanism.

For example, in an automatic transmission, wherein an overdrive mechanism is added to an underdrive mechanism of three forward gear stages, the underdrive mechanism in the form of a first transmission section and the overdrive mechanism in the form of a second transmission mechanism may be simultaneously or alternately shifted as shown in FIG. 4, so that multi-gear shifts of six forward gear stages can be achieved.

With the above-described automatic transmission, wherein the first transmission section and the second transmission section are simultaneously or alternately shifted to achieve the multi-gear shifts, there are gear stages achieved due to the first transmission section and the second transmission section being shifted in directions opposite to each other. In this case, there has occurred a disadvantage that, unless the timing of these shifts into these gear stages is adequately and strictly controlled, fluctuations in torque are high, whereby an uncomfortable feeling is experienced by the driver.

More specifically, as shown in FIG. 4, when the automatic transmission as a whole is shifted up from 2nd gear stage to 3rd gear stage and from 4th gear stage to 5th gear stage for example, the first transmission section is shifted to high, whereas the second transmission section is shifted to low. When the automatic transmission as a whole is shifted down from 5th gear stage to 4th gear stage and from 3rd gear stage to 2nd gear stage, the first transmission section is shifted to low, whereas the second transmission section is shifted to high. For the above-described reasons, unless the shifts are effected accurately with adequate timing, the fluctuations in output torque can be high, in an extreme case, a sensation of a down shift performed immediately after an up shift or an up shift is performed immediately after a down shift, is felt.

On the other hand, to insure the durability of the frictionally engaging device of the transmission, there are instances where the normal order of shifting, i.e. 1st–3rd –5th–6th gear stage in FIG. 4 with the overdrive mechanism added thereto is changed to an order of 1st–3rd–4th–6th gear stage, for example. According to this method, the former and the latter examples are equal in terms of number of gear stages available, however, instead of the 3th–5th gear shift, which is performed by the frictionally engaging device (so-called direct clutch) where the durability is most severely tested, the overdrive mechanism (the second transmission section) is instead shifted, with 2nd gear stage of the first transmission section being retained to achieve 4th gear stage, while the 4th–6th gear shift is performed with the shift point being slightly low rpm's so that the durability of the frictionally engaging device can be enhanced. Normally, the above-described shift is performed only when a throttle opening (engine load) is high, whereas, for a low throttle opening, the order of shifting pattern of 1st–3rd–5th–6th gear stage is performed as in the past.

However, even in the above-described case, there occur gear stages which are achieved by shifting the first transmission section and the second transmission section in directions opposite each other as in the 4th–5th gear shift or the 5th–4th gear shift. As a consequence, the aforesaid disadvantages similarly can occur.

SUMMARY OF THE INVENTION

The present invention has as its object the elimination of the above-described disadvantages of the prior art and the provision of a method and a system for shift control of an automatic transmission for a vehicle, wherein, shift shocks are minimized, even when a first transmission section and a second transmission section are shifted simultaneously or alternately, to thereby achieve multi-gear shifts.

To this end, the present invention contemplates a method for shift control of an automatic transmission for a vehicle, wherein there are provided at least a first transmission section and a second transmission section, which are capable of shifting automatically and independently of each other, and the first transmission section and the second transmission section are simultaneously or alternately shifted, to thereby achieve multi-gear shifts, including the steps of calculating a desired gear stage of the transmission; judging whether or not this gear requires shifting the first transmission section and the second transmission section in directions opposite each other; judging whether or not the type of shift is a down shift in the automatic transmission as a whole; and prohibiting such shifting when the shift occurs by shifting the first transmission section and the second transmission section in opposite directions and the shift is a down shift in the automatic transmission as a whole.

Furthermore, in a specific form of the present invention, when non-prohibited shift is called for following the determination of the prohibition of the aforesaid shift, the prohibition of shifting is removed, so that the non-prohibited shift can be smoothly performed.

According to the present invention, when the first transmission section and the second transmission section are to be shifted in directions opposite to each other and the shift is a down shift in the automatic transmission as a whole, such shifting is prohibited so that the advantage obtained by the multi-gear shifts is retained, and all up shifts are permitted because the shift shocks then are relatively low. On the other hand, only down shifting achieved as the result of that the first transmission section and the second transmission section being shifted in directions opposite each other are selectively omitted, so that the above disadvantage can be satisfactorily controlled, with the advantages of the multi-gear shifts being retained.

Additionally, according to the present invention, down shifts to specific gear stage are not prohibited. For example, a shift from 3rd gear stage to 2nd gear stage is prohibited because the shift is achieved by reverse shifting of the transmission sections. However, the shift from 4th stage gear to 2nd gear stage is not prohibited because the shift is achieved by only the shifting of the first transmission section. In the case of a three speed first transmission section and a two speed second transmission section, types of shifts prohibited according to the present invention include a shift from 5th gear stage to 4th gear stage, a shift from 5th gear stage to 2nd gear stage and 3rd gear stage to 2nd gear stage.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 4 is a chart setting forth an explanation of the gear stages of the automatic transmission, wherein the first transmission section and the second transmission section are shifted simultaneously or alternately, to thereby achieve multi-gear shifts.

DETAILED DESCRIPTION OF THE PREFERRED EMBODIMENT

A detailed description will now be given of one embodiment of the present invention with reference to the accompanying drawings.

Figure 2:
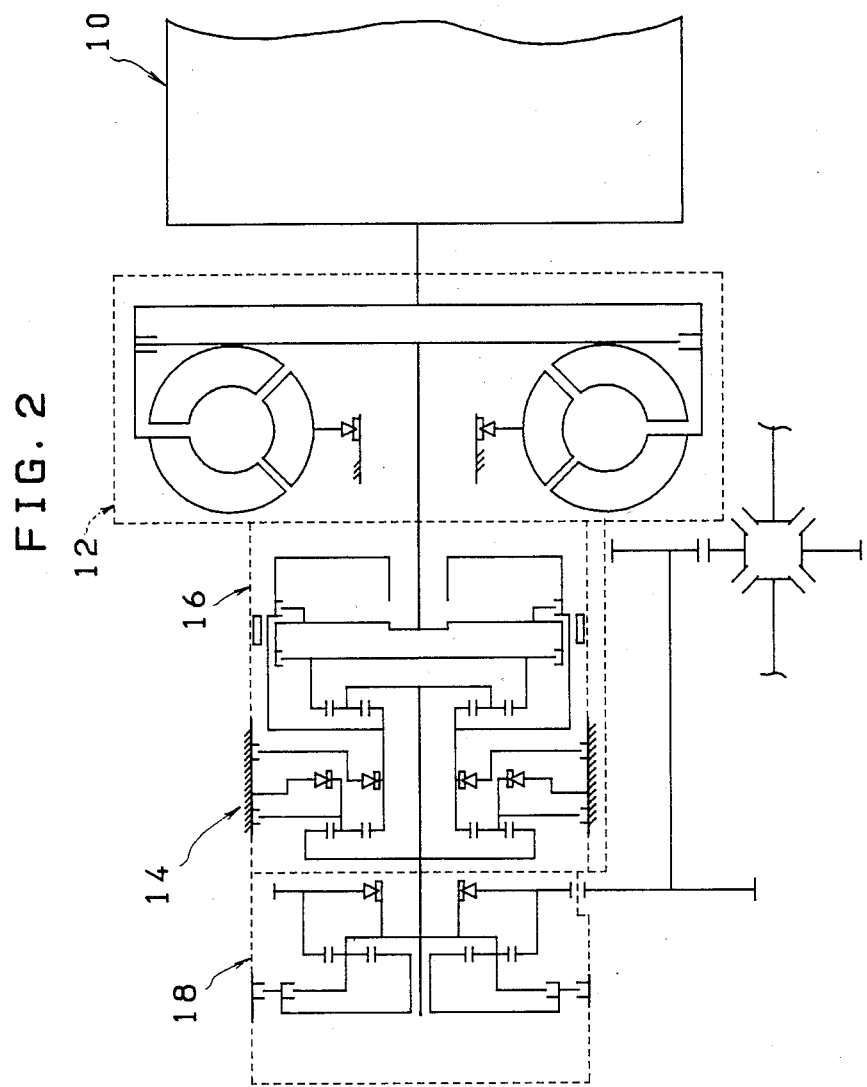
FIG. 2 is a schematic diagram showing an automatic transmission for a vehicle, to which is applied the above-mentioned embodiment.

FIG. 2 is a schematic diagram showing an automatic transmission having six gear stages for FF, to which is applied the present invention. This automatic transmission includes a torque converter 12 and a transmission 14, which are provided coaxially with an engine 10, and the transmission 14 includes a first transmission section 16 and a second transmission section 18, which are connected in series to each other. The first transmission section 16 is a standard underdrive device and has three forward gear stages. While, the second transmission section 18 is an overdrive device and has two forward gear stages including a lower gear stage with a reduction gear ratio of 1 and a higher gear stage for overdrive. Since the structure of the first and the second transmission sections 16 and 18 is conventional and well known, only a schematic diagram is shown in FIG. 2 and a detailed description thereof will be omitted.

A description will now be given of this embodiment with reference to the flow chart in FIG. 1.

Firstly, in Step 30, as an initial operation, a flag F is set at zero. The flag F is provided for testing on whether shifting of the automatic transmission is controlled or not. In a main routine of Step 32, it is determined what gear stage the present operating conditions call for, i.e. an indicated gear stage is calculated from the vehicle speed and the engine load determined by sensing a throttle opening, or the output shaft torque of the engine, as is well known.

Subsequently, the state of the flag F is judged in Step 34. Assuming that the flag F is set at zero, it is determined in Step 36 whether the present gear stage is or is not different from the indicated gear stage calculated in the main routine, i.e. whether there is a need for shifting or not. When F=0 (i.e. it is not the period of time during which a shift of the automatic transmission is prohibited), and no shift has been indicated, the sequence moves to Step 56 wherein solenoid valves for shift control are driven in accordance with maintaining the indicated gear stage calculated in Step 32, and the automatic transmission remains the indicated gear stage.

When it is judged that there is a need for shifting in Step 36, a judgment is made whether the shift is a down shift of the 5th-4th type (Step 38), a down shift of the 5th-2nd type (Step 40) or a down shift of the 3rd-2nd type (Step 42). These down shifts must be performed such that the first transmission section and the second transmission section are shifted in directions opposite to each other, so that the automatic transmission as a whole can be down shifted.

If none of the above shift type is judged, the automatic transmission performs a shift to newly indicated gear stage in Step 56. However, when any one of the Steps 38, 40 and 42 is judged to be affirmative, the indicated gear stage calculated in the main routine of the Step 32 is first stored (Step 44), and a newly indicated gear stage is obtained by adding 1 gear stage number to the indicated gear stage thus stage stored (Step 46), i.e., gear stage 4 is changed to 5. Further, the flag F is then set at 1 (Step 48). The reason why the indicated gear stage is stored in Step 44 is that the indicated gear stage calculated in the main routine is different from the gear stage indicated in the Step 46, and it is necessary to subsequently calculate the following gear stage on the basis of the gear stage calculated in the main routine (Step 32).

When the flag F=1, the routine proceeds from the Step 34 to Step 50. In the Step 50, a judgment is made whether there is a new need for shifting because of a difference between the indicated gear stage calculated in the main routine in the Step 32 and the gear stage stored in the Step 44. When there is no need for shifting, shifting of the automatic transmission is prohibited. However, when a new need for shifting occurs, the prohibition of shifting of the automatic transmission is removed in Step 52, and the flag F is reset at zero in Step 54.

When the indicated shift is the 5th-4th down shift, an affirmation condition is judged in the Step 38. As a result, the indicated gear stage is raised to 5th and a 5th—5th non-shift is performed, i.e. the prohibition of shifting is thus performed in Steps 46 and 56. In this case, since the stored gear stage in the Step 44 is 4th gear, a new need for shifting judged in Step 50 for the 5th–3rd shift or the 5th—5th non-shift is permitted. As a consequence, the actual shifts which occur when the prohibition of shift is removed in the Step 52 are the 5th–3rd gear shift, and the 5th—5th non-shift, whereby only the first transmission section 16 is shifted or no shift occurs, so that shocks during shifting can be avoided.

Figure 1:
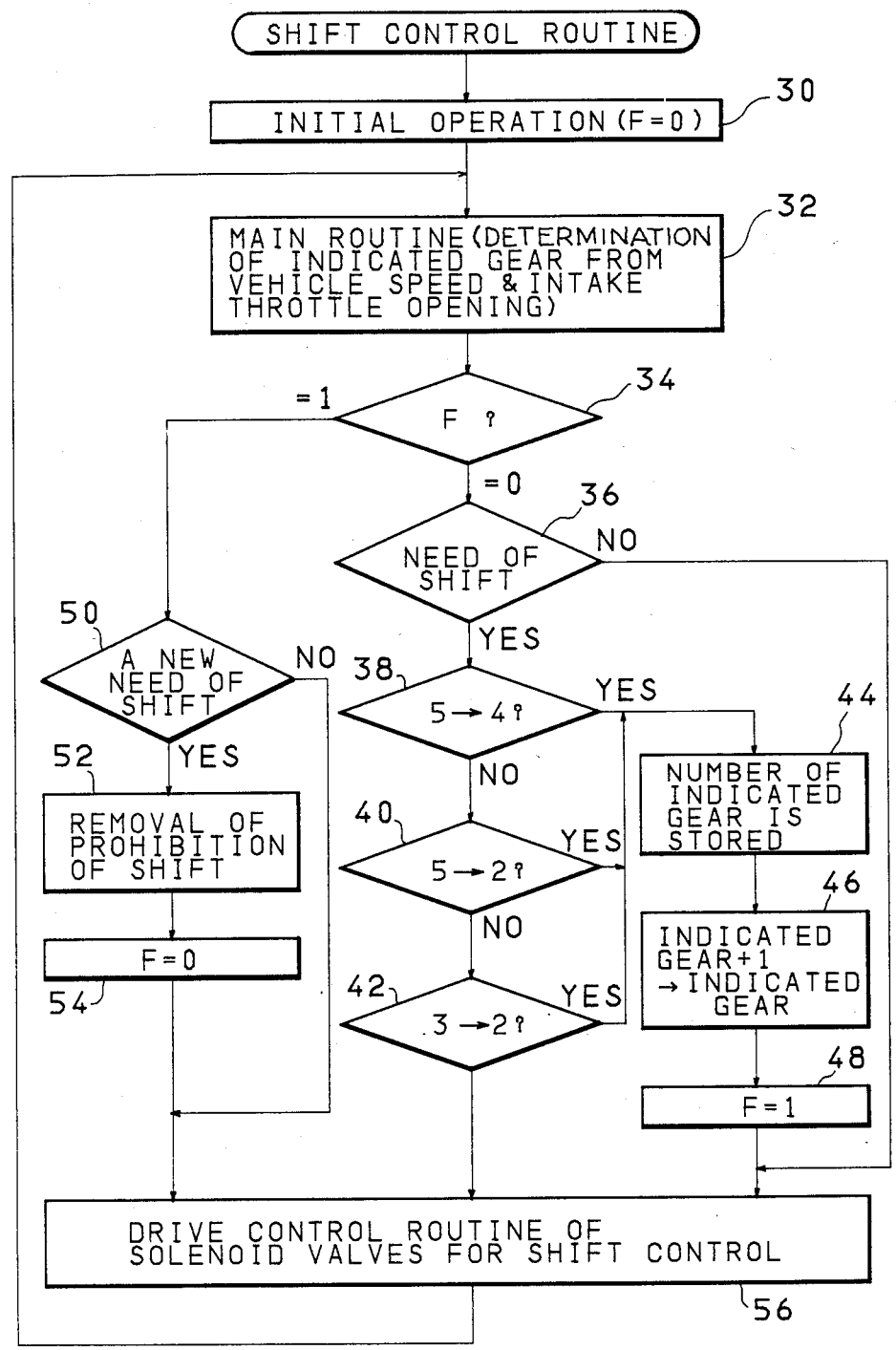
FIG. 1 is a flow chart showing an embodiment of the method for shift control of an automatic transmission for a vehicle according to the present invention.

As apparent from the flow chart in FIG. 1, the shifts prohibited in this embodiment are limited to the cases where the first and the second transmission sections 16 and 18 are shifted in directions opposite each other and the automatic transmission as a whole is down shifted. No shift prohibition occurs in the case where the automatic transmission as a whole is shifted up, even if the first and the second transmission sections 16 and 18 are shifted in the directions opposite to each other.

Figure 3:
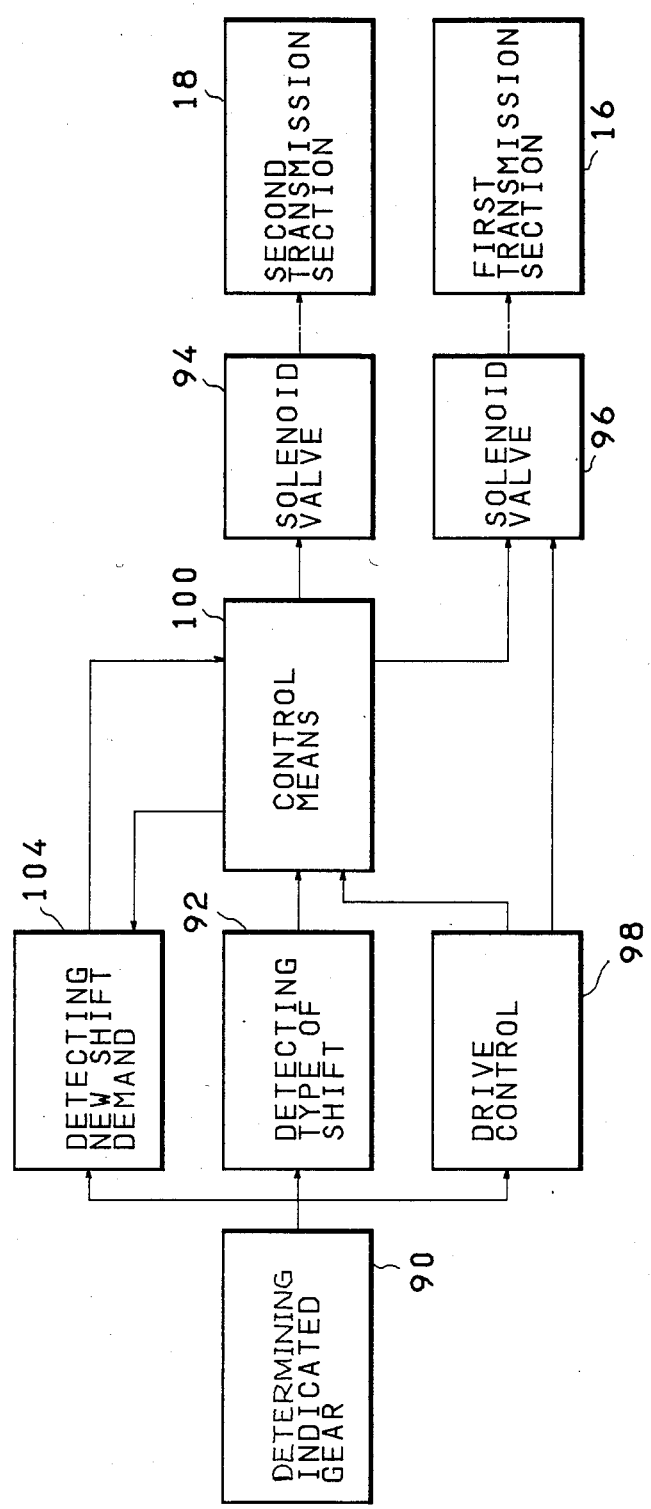
FIG. 3 is a block diagram setting forth an explanation of the functions of the element of the above-mentioned automatic transmission.

FIG. 3 is the block diagram showing the functions of the system in the above-described embodiment. An indicated gear stage is determined at 90 by a vehicle speed, a throttle opening and the like. The type of shifting is judged at 92 as to whether or not the type of shift is the 5th–4th gear shift, the 5th–2nd shift or the 3rd–2nd shift. Solenoid valves 94 and 96 control the gear stages of the first transmission section 16 and of the second transmission section 18, respectively. Drive control of the solenoid valves 94 and 96 occurs at 98 such that the actual gear stages become the indicated gear stages. Control means 100 changes the shift indication into the shift indication of the 5th—5th shift, the 5th–3rd shift or the 3rd—3rd shift, respectively, when the type of shift indication is the 5th–4th shift, the 5th–2nd shift, or the 3rd–2nd shift. New need for shifting is detected at 104 by means which detects a new shift demand generated during the period of time of prohibition of shifting, and, when there is a need for shifting, removes the function of the control means 100.

In the above-described embodiment, there has been shown the example of an automatic transmission, wherein the first transmission section and the second transmission section are shifted simultaneously or alternately regardless of the throttle opening, to thereby achieve the multi-gear shifts with six forward gear stages. However, the automatic transmission according to the present invention need not necessarily be limited to an automatic transmission of this type, and, for example, the present invention is applicable to an automatic transmission for a vehicle, wherein the first transmission section and the second transmission section are shifted simultaneously or alternately only when the aforesaid throttle opening is larger than a predetermined value, to thereby achieve multi-gear shifts.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for shift control of an automatic transmission having at least a first transmission section and a second transmission section, which are capable of simultaneously or alternately shifting automatically and independently of each other to achieve multi-gear shifts, comprising the steps of:
   determining an indicated gear stage of said automatic transmission;
   testing if a shift to said indicated gear stage occurs by shifting said first transmission section and said second transmission section in directions opposite to each other;
   testing if said shift is a down shift in the automatic transmission as a whole; and
   prohibiting said shift when said shift occurs by shifting said first transmission section and said second transmission section in the directions opposite to each other and said shift is a down shift in the automatic transmission as a whole.

2. The method of claim 1 including the steps of detecting the calculation of another indicated gear stage and removing said prohibition when said another indicated gear stage is detected.

3. The method of claim 1 wherein said second transmission section has two gear stages and said step of prohibiting includes the step of adding one gear stage to said indicated gear stage.

4. The method of claim 1 including the step of prohibiting said shift only when said shift occurs by shifting said first transmission section and said second transmission section in directions opposite to each other and said shift is a down shift in the automatic transmission as a whole.

5. The method of claim 2 including the step of prohibiting said shift only when said shift occurs by shifting said first transmission section and said second transmission section in directions opposite to each other and said shift is a down shift in the automatic transmission as a whole.

6. The method of claim 5 wherein said second transmission section has two gear stages and said step of prohibiting includes the step of adding one gear stage to said indicated gear stage.

7. A system for shift control of an automatic transmission, comprising:
   a first transmission section and a second transmission section, which are capable of selectively shifting gear stages automatically and independently of each other, to thereby achieve multi-gear shifts;
   means for determining an indicated gear stage in accordance at least a with vehicle speed and engine load;
   means for controlling shifting of said first transmission section and of said second transmission section;
   means for driving said control means such that an actual operating gear stage corresponds to said indicated gear stage;
   means for detecting a shift direction;
   means for prohibiting a shift of said first transmission section and said second transmission section in directions opposite to each other when said shift comprises a down shift in the automatic transmission as a whole; and
   means for detecting an indicated gear stage corresponding to a non-prohibited shift and for permitting said non-prohibited shift.

* * * * *